United States Patent [19]
Roger

[11] 3,778,824
[45] Dec. 11, 1973

[54] RADAR SYSTEM FOR DETECTING LOW-FLYING OBJECTS

[75] Inventor: Joseph Roger, Paris, France
[73] Assignee: Thomson CSF, Paris, France
[22] Filed: Aug. 23, 1971
[21] Appl. No.: 173,818

[30] Foreign Application Priority Data
Aug. 21, 1970  France .......................... 7030702

[52] U.S. Cl. .............................. 343/7 A, 343/16 M
[51] Int. Cl. ............................ G01s 9/02, G01s 9/22
[58] Field of Search .......................... 343/7 A, 16 M

[56] References Cited
UNITED STATES PATENTS

| 3,353,180 | 11/1967 | Anderson | 343/16 M |
| 3,197,776 | 7/1965 | Winn | 343/16 M |
| 3,128,461 | 4/1964 | Case, Jr. | 343/16 M |
| 3,680,102 | 7/1972 | Poinsard | 343/16 M |
| 3,560,974 | 2/1971 | Lecourtier et al. | 343/16 M |
| 2,717,380 | 9/1955 | Brooks, Jr. | 343/16 M |

Primary Examiner—Malcolm F. Hubler
Attorney—Karl F. Ross

[57]  ABSTRACT

To eliminate gaps in the vertical radiation pattern of a radar antenna designed to detect low-flying objects, the outgoing microwave energy is transmitted simultaneously over a direct path and over a reflected path with the aid of two horn radiators also serving to discriminate between incoming wave energy received over these two paths. By alternating between cophasal and antiphasal transmission and/or between additive and subtractive reception over these two paths, the optimum mode of operation for a given angle of elevation can be determined.

4 Claims, 10 Drawing Figures

Joseph Roger
INVENTOR.

BY

Karl F. Ross
Attorney

INVENTOR:
Joseph Roger

BY

Karl F. Ross
Attorney

Joseph Roger
INVENTOR.

BY

Karl F. Ross
Attorney

RADAR SYSTEM FOR DETECTING LOW-FLYING OBJECTS

My present invention relates to a radar system, more specifically to a system designed to detect low-flying aircraft and other objects.

The coverage of a monitoring radar may be defined as the air space effectively surveyed in the vertical plane. This coverage, expressed for example in square kilometers, depends on various parameters including the coefficient of reflection of the ground (soil or water) if the objects to be detected are at low elevation above the earth's surface.

If ground reflection is significant, energy transmitted and/or received directly across free space will combine in the receiver with energy reflected at the surface, the two energy components bearing a phase relationship which is a function of the angular elevation of the reflecting object and may vary between 0 and $\pi$ for small angular increments; thus, within a given vertical plane corresponding to a chosen azimuthal direction, the radiation pattern may have several lobes and gaps within a relatively narrow angular range.

Various solutions have been proposed for remedying this inconvenience. These solutions generally involve rather costly alterations as well as a reduction in signal strength due to suppression of the ground wave reflected on the surface.

The general object of my invention is to provide an improved radar system, and a method of operating such system, which eliminates these drawbacks and effectively utilizes both the free-space wave and the ground wave in detecting low-flying aircraft and the like.

In accordance with this invention, components of microwave energy transmitted and received over a first path (directly through space) and over a second path (via surface reflection), in the same azimuthal direction, are combined at a receiver with different relative phasings to maximize the combined energy received from a reflecting object.

The variation in phasing may involve a periodic reversal of the relative phase of the two separately traveling energy components so that, if the radiation pattern produced by the additive superposition of these components exhibits a gap for a particular elevational angle, the corresponding pattern obtained with subtractive superposition will have a lobe at that point. By comparing the energies received with different phase relationships, the system may determine which of the two modes of reception is more effective in a particular antenna position and may thereupon direct the incoming energy to the load (e.g. the input circuit of a monitoring cathode-ray tube) exclusively via the more strongly energized channel. If, during surveillance, the incoming energy is switched alternately to the additive and the subtractive channel, the integrated magnitudes of the channel outputs may be stored in respective registers to facilitate such comparison.

The antenna used in a system embodying the present improvement may comprise a pair of horn radiators designed to transmit and receive the direct wave and the ground wave, respectively. Advantageously, the two radiators are closely juxtaposed at the focus of a common parabolic reflector.

The above and other features of my invention will be described hereinafter in greater detail with reference to the accompanying drawing in which.

Figure 1:
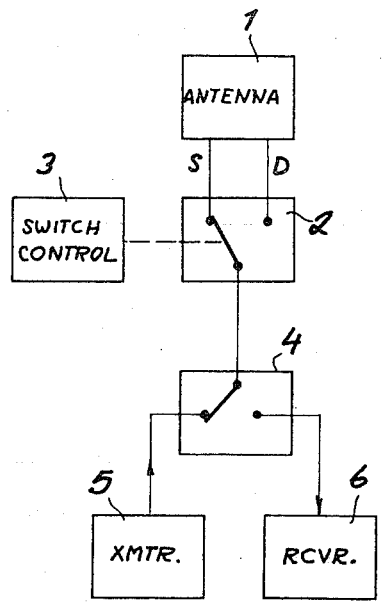
FIG. 1 is an overall block diagram of a system according to the invention, with alternate utilization of an additive and a subtractive channel in both transmission and reception.

The system shown in FIG. 1 comprises an antenna 1, of physically or electronically trained upon a region low above the horizon which it sweeps with a progressively varying angle of elevation as is well known per se. The antenna may also be rotated at a relatively slow rate about a vertical axis to scan the entire horizon or a predetermined azimuthal sector.

Figure 6:
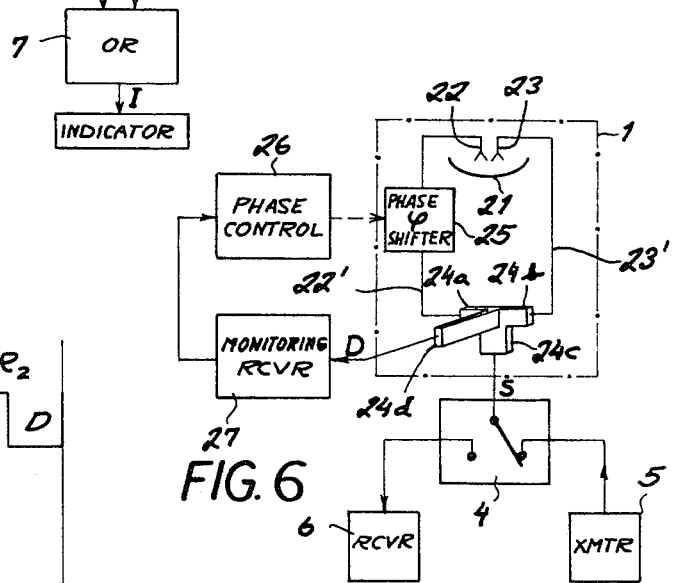
FIG. 6 is a block diagram similar to that of FIG. 5, showing a modification.

The two radiators of the antenna 1 are connected to a switchover stage 2 by way of two parallel channels S (sum) and D (difference) which are connected thereto, e.g. via a Magic-T junction as likewise shown in FIG. 6, in such a way that the energy components intercepted by the two radiators are combined additively on channel S and subtractively on channel D. By virtue of this connection, outgoing microwave energy will be fed to the two radiators via channel S for cophasal transmission and via channel D for antiphasal transmission. The two channels may be constituted by suitable waveguides; the switchover stage 2, as well as a similar stage 4 in tandem therewith, may comprise conventional electronic means for selectively blocking passage through one or the other waveguide.

Figure 10:
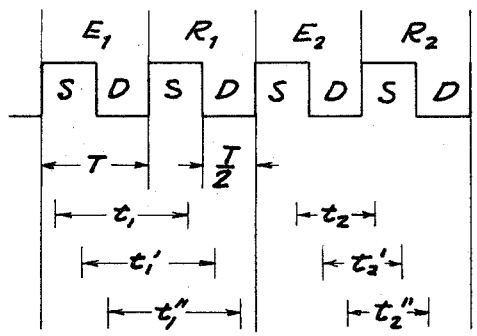
FIG. 10 is a time diagram relating to the operation of the system of FIG. 1.

Switching stage 4 connects stage 2 alternately to a transmitter 5 and a receiver 6. As in a conventional radar system, in which stage 2 is omitted and switch 4 is coupled to antenna 2 directly via channel S, this switch 4 may be periodically reversed by a timer or clock circuit (not shown) effecting a switchover from transmission to reception and vice versa at intervals T corresponding to the transit time of emitted wave energy from the antenna to the remotest object to be detected. This has been illustrated in FIG. 10 showing two transmission intervals $E_1$, $E_2$ alternating with two reception intervals $R_1$, $R_2$. A complete switching cycle of stage 4, therefore, has a duration 2T corresponding to the maximum two-way transit time.

In accordance with my invention, switching stage 2 is operated in timed relationship with stage 4 by means of a control circuit 3 which may form part of the aforementioned clock circuit. Switch stage 2 is periodically reversed at intervals T/2 whereby, as also illustrated in FIG. 10, additive channel S and subtractive channel D are alternately utilized during each transmission interval and each reception interval.

Consider a signal whose back-and-forth transit time ranges between T and 3T/2. Energy transmitted toward this object in the first quarter of interval $E_1$ is received back, after a time $t_1$, during the second quarter of interval $R_1$. In this instance, transmission and reception take place over the same (additive) channel S. On the other hand, energy radiated toward the same object in the second quarter of interval $E_1$ returns, after a like period $t_1'$, in the third quarter of interval $R_1$, being thus transmitted via channel S and received via conjugate channel D. The first of these two instances represents the conventional method; in the second instance the two energy components undergo a relative phase reversal within the system between transmission and reception. Thus, if the cophasally transmitted energy components return in phase, their combined energy will be a maximum in channel S and a minimum in channel D; under these circumstances the incoming signal is strong in the second quarter but weak in the third quarter of interval $R_1$. If, however, the cophasally radiated components return with a relative phase shift of approximately 180°, their combined energy will be a minimum in channel S and a maximum in channel D; thus, the signal would then come in weak during the second quarter and strong during the third quarter of interval $R_1$. Energy emitted in the third quarter of interval $E_1$, via channel D, is received back in the last quarter of interval $R_1$, also by way of channel D, as indicated at $t_1''$ in FIG. 10; this signal will also be strong if the relative phase shift in transit is substantially zero or a multiple of $2\pi$.

An analogous situation exists for reflecting objects whose back-and-forth transit time ranges between T/2 and T. Energy emitted cophasally (via channel S) in the second quarter of interval $E_2$ is received back, after a time $t_2$, in the first quarter of interval $R_2$ by way of channel S; energy radiated antiphasally (via channel D) toward the same object in the third quarter of interval $E_2$ returns in the second quarter of interval $R_2$ after a like period $t_2'$ by way of the conjugate channel S. Again, therefore, the incoming signal may be relatively strong during one part (e.g. the first quarter) of the receiving interval $R_2$ and relatively weak during another part (e.g. the second quarter) of that interval, or vice versa, depending on whether the energy components intercepted by antenna 1 are mutually in phase or in phase opposition. It will also be apparent that energy radiated in the last quarter of interval $E_2$ via channel D and returning by way of the same channel after a period $t_2''$, i.e. in the third quarter of interval $R_2$, will also give rise to a strong signal if the relative phase shift during transit is substantially zero (or a multiple of $2\pi$).

The foregoing analysis permits the establishment of certain rules concerning the optimum phasing of the radiated energy components on the basis of comparison of signal strength in different portions of a receiving interval, having regard also to the distance of the reflecting object which may be conventionally determined, for example, by a progressive change in the frequency of the outgoing wave.

Figure 2:
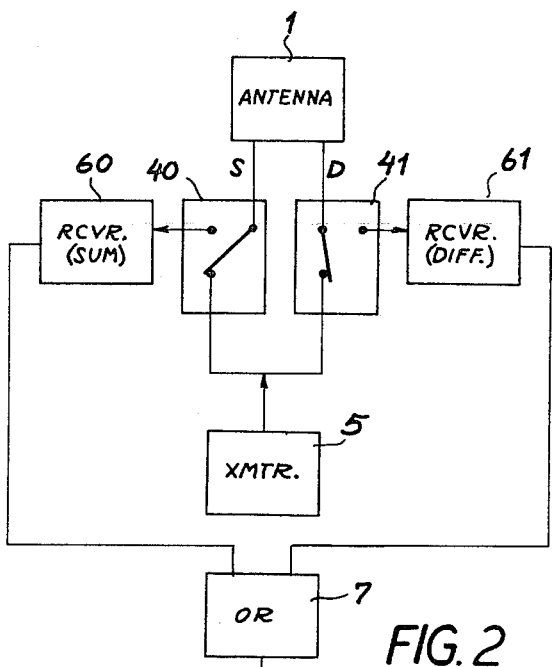
FIG. 2 is a block diagram of an embodiment with transmission on either channel and alternate reception over these channels.

In FIG. 2 I have shown an alternate embodiment wherein switching stage 2 of FIG. 1 has been omitted while switching stage 4 has been split into two switches 40 and 41 connected to channels S and D, respectively. During emission, these switches connect the transmitter 5 in parallel to the channels S and D feeding a pair of radiators of antenna 1; during reception, these two switches are reversed (under the control of the timer not shown in this Figure) so that channel S leads to a receiver 60 whereas channel D terminates at a receiver 61. The outputs of receivers 60 and 61 are applied through a common OR gate 7 to a common load in the form of a conventional visual indicator I.

In operation, energy components received with and without surface reflection combine with relatively inverted phasing in channels S and D respectively connected to receivers 60 and 61. Receiver 60 will detect a stronger signal if the normal radiation pattern of antenna 1 has a lobe for the particular angle of elevation; if that pattern has a gap at that point, the signal fed to receiver 61 will prevail. In either case, therefore, indicator I will be sufficiently energized.

Because of the partial cancellation of the waves fed to antenna 1 via channels S and D, only one of the radiators of this antenna will be effectively energized during transmission. The system of FIG. 2 may also be modified by omitting the connection from transmitter 5 to one of the switches 40, 41 so that only one of the channels is used during transmission.

Figure 3:
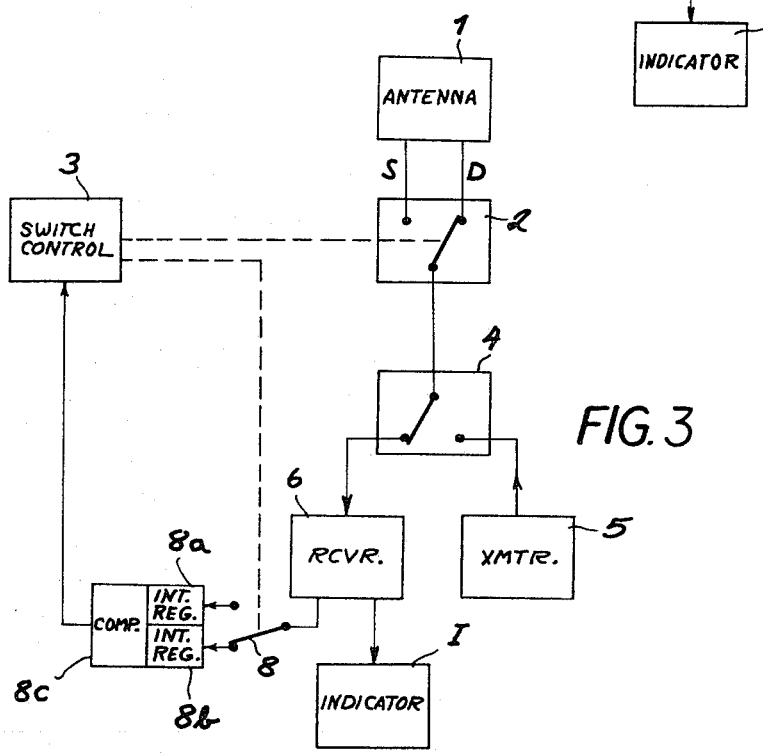
FIG. 3 is a block diagram of a system similar to that of FIG. 1 but with automatic selection of the more effective channel.

FIG. 3 shows the system of FIG. 1 modified by the addition of a further switching stage 8 operated in step with stage 2 by switch control 3. Switch 8 connects an ancillary output of receiver 6 alternately to one of two integrating registers 8a and 8b feeding respective inputs of a comparator 8c. Registers 8a and 8b store the energy arriving over channels S and D, respectively, during the reception intervals established by switch 4. In the absence of reflecting objects, i.e. in a state of surveillance, switches 2 and 8 are periodically reversed at intervals T/2 as described with reference to FIG. 1. If, however, a reflecting object is detected, either or both registers 8a, 8b are energized; if the charges stored in these registers differ significantly, comparator 8c responds and signals the control circuit 3 to freeze the switch 8 and to arrest the switch 2 in a position (not necessarily the same during transmission and reception) in which the ancillary output of receiver 6 goes to the register with the higher charge. If the position of the object changes so that the selected channel is no longer sufficiently energized during reception, the charge stored in the corresponding register disappears and controller 3 reverts to its normal operation.

Figure 4:
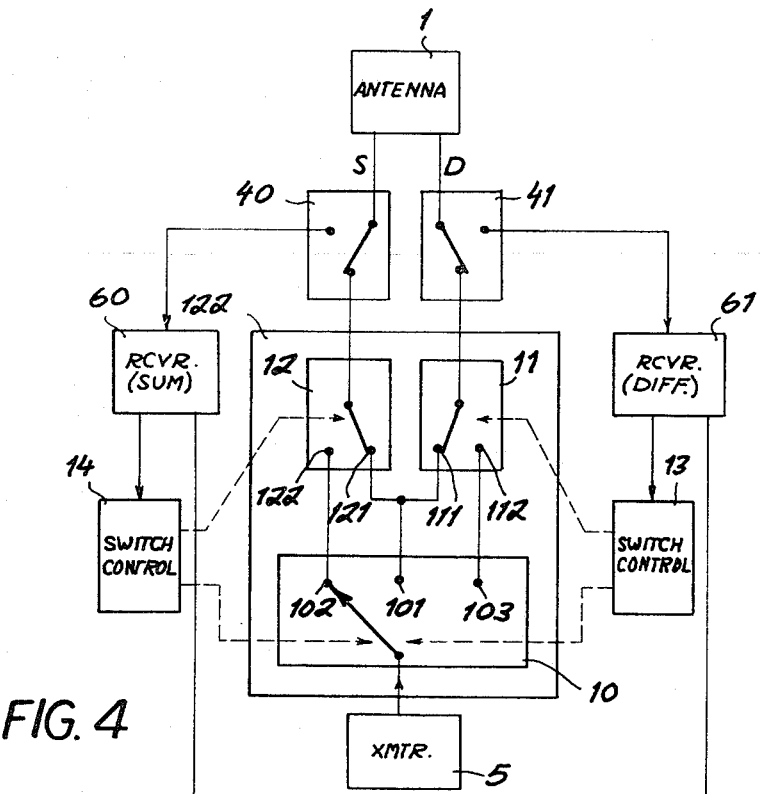
FIG. 4 is a block diagram of a system similar to that of FIG. 2, again with means for selecting the more effective channel.

FIG. 4 illustrates a similarly autoselective modification of the system shown in FIG. 2. Switches 40 and 41 are connected to transmitter 5 by way of another switching network 9 including two parallel switches 11, 12 in cascade with a common three-position switch 10. It will be understood that, as before, the armatures and bank contacts of these switches are intended to symbolize equivalent electronic circuitry. Switch 10 has three contacts 101, 102, 103, the latter two being connected to contacts 122 and 112, respectively, of switches 12 and 11 whereas contact 101 is connected in parallel to contacts 121 and 111 of these two switches. Ancillary outputs of receivers 60 and 61 work into respective controllers 14 and 13 which jointly set the switch 10 and individually set the switches 12 and 11, respectively.

When the system operates in surveillance, receivers 60 and 61 have no significant output and controllers 13, 14 hold the arm of switch 10 on its middle contact 101. In the position illustrated in FIG. 4, swithes 11 and 12 then connect transmitter 5 to antenna 1 via channels D and S in the transmission phase in which the switches 40 and 41 extend these channels to network 9. By a periodic and concurrent reversal of switches 11 and 12, transmission may take place alternately over channels S and D.

With the arm of switch 10 engaging its bank contact 102, channel D is excluded from transmission regardless of the position of switches 11 and 12. The same applies to channel S if the switch arm engages its contact 103. On the basis of the rules mentioned in conjunction with FIG. 10, therefore, controllers 13 and 14 may operate switches 10 – 12 to establish optimum transmitting conditions in response to output signals from receivers 60 and 61. These controllers are advantageously sensitive to substantially lower signal levels than the load I energized by the main receiver outputs.

Switches 10 – 12 may also be operated to transmit simultaneously over channels S and D, as mentioned in conjunction with FIG. 2 and as illustrated in FIG. 4.

Figure 5:
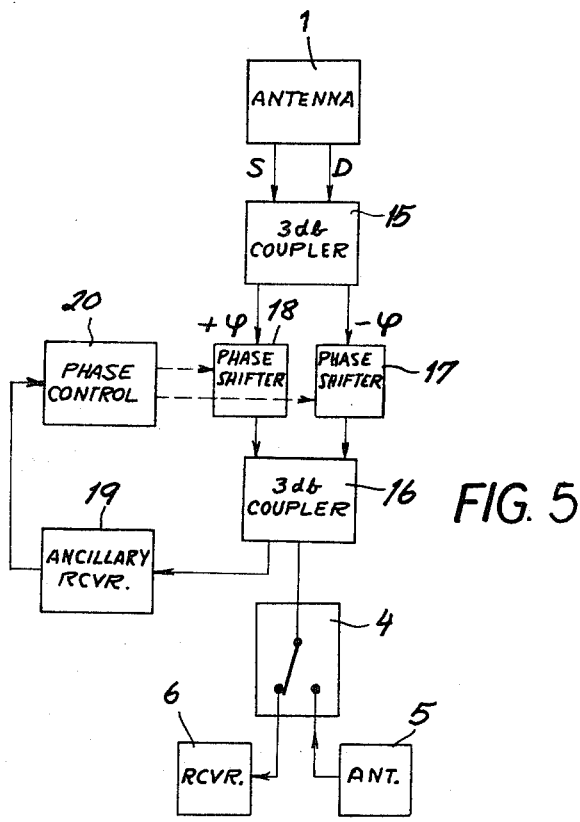
FIG. 5 is a block diagram of a further embodiment.

In FIG. 5 the antenna 1 is connected to the transmit/receive switch 4 through a pair of cascaded coupling stages 15 and 16 inserted in the two channels S and D, couplers 15 and 16 being of the conventional energy-splitting (3dB) type described, for example, in Radar Handbook by Merrill I. Skolnik (McGraw-Hill, Inc. New York, 1970). Inserted in these channels, between the two coupling stages, are a pair of complementary phase shifters 17 and 18 responsive to a controller 20. Coupler 16 also feeds an ancillary receiver 19 whose output operates the phase-control circuit 20 to alter the relative phase of the energy components in a sense tending to maximize the combined energy delivered to switch 4 during reception.

In FIG. 6 I have shown details of the construction of antenna 1. Two horn radiators 22 and 23 are positioned near the focus of a parabolic reflector 21. These radiators may be differently oriented and/or polarized for preferential transmission and reception via the direct path and via surface reflection, respectively. Radiators 22 and 23 are connected through respective wareguides 22', 23' to opposite branches 24a, 24b of a Magic-T junction 24; a third branch 24c of this junction, lying with its major faces in the H-plane of main branches 24a and 24b, is electrically connected in parallel to these two branches while a conjugate fourth branch 24d is differentially connected thereto. Branch 24c leads to transmit/receive switch 4 which operates in the manner described with reference to FIG. 1. Branch 24d works into an ancillary or monitoring receiver 27 which in turn influences the setting of a phase shifter 25 in waveguide 22' by means of a control circuit 26.

If the phase shift introduced by circuit 25 is zero, horns 22 and 23 radiate cophasally during transmission and feed the returning energy components to switch 4 and receiver 6 with whatever relative phase shift they have undergone in transit. Junction 24 additively combines these energy components in branch 24c which therefore constitutes part of the summing channel S of the preceding Figures; if the relative phase shift is substantially equal to $\pi$ or an odd multiple thereof, the signal in channel S is of minimum strength. Under these circumstances, however, the conjugate branch 24d forming part of differential channel D carries a maximum signal amplitude, the monitoring receiver 27 thereupon operating the phase controller 26 to let circuit 25 introduce a phase shift of $\pi$ in the waveguide 221. This relative phase reversal maximizes the signal in channel S and minimizes that in channel D. Phase controller 26 may include a bistable unit to reverse the phase of waveguide 22' in response to any rise in the signal strength on channel D above a predetermined threshold.

It will be understood that the single phase shifter 25 of FIG. 6 could also be replaced by two complementary phase shifters 17, 18 (FIG. 5) in waveguides 22', 23'.

Figure 7:
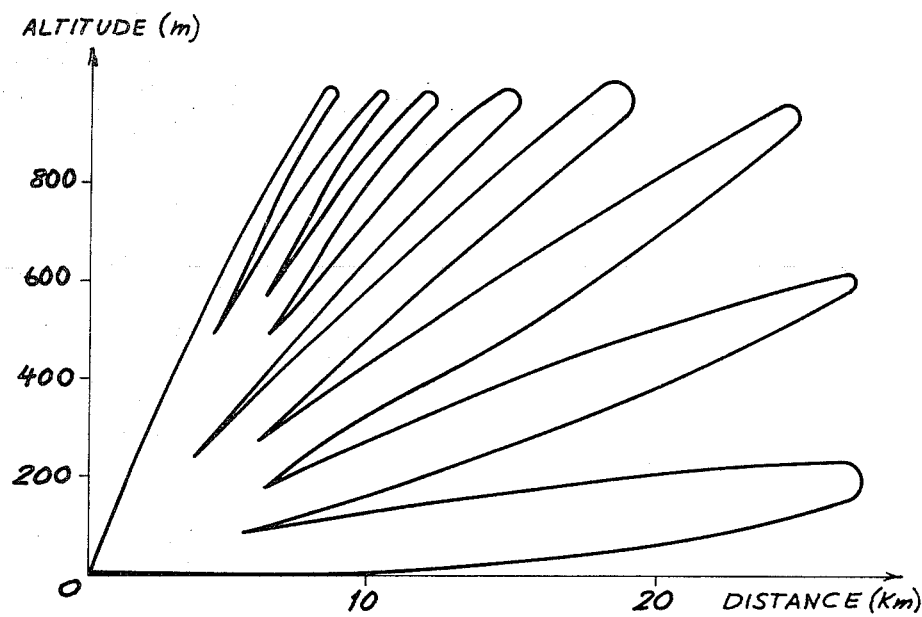
FIG. 7 shows the vertical-plane radiation pattern of a conventional radar used for low-altitude surveillance.

FIG. 7 shows the vertical-plane radiation pattern of a conventional radar system similar to that of FIG. 2 but lacking the channel D and the associated switch 41 and receiver 61. The diagram shows, for angles of elevation corresponding to object altitudes of up to about 1 km, alternating lobes and gaps at distances ranging between roughly 5 and 25 km.

Figure 8:
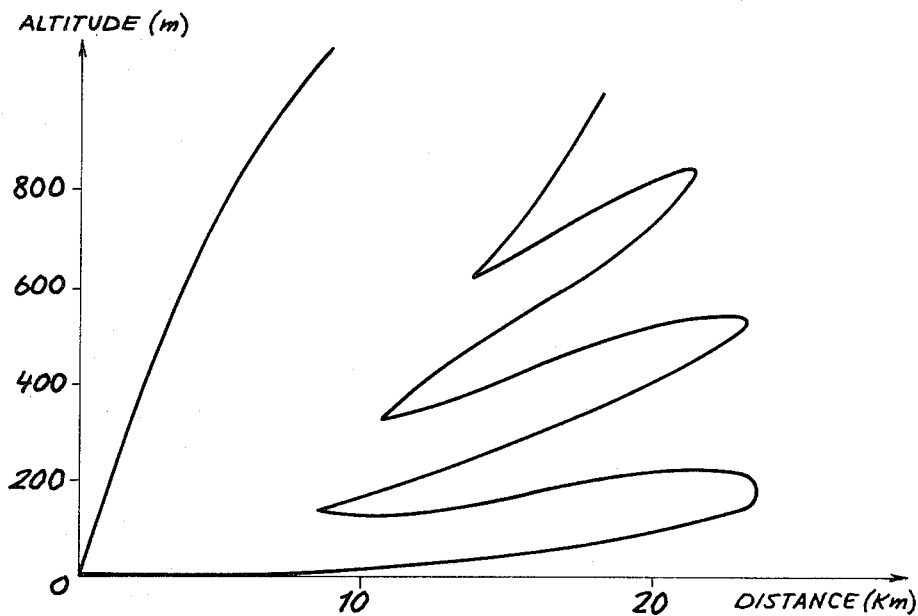
FIG. 8 is a corresponding radiation pattern obtained with my improved system according to the embodiment of FIG. 2.

FIG. 8 illustrates, by way of comparison, the radiation' pattern in the same system with the improvement disclosed in FIG. 2; it will be noted that the gaps have been virtually eliminated for distances up to about 10 km and that the number of such gaps for greater distances has been considerably reduced.

Figure 9:
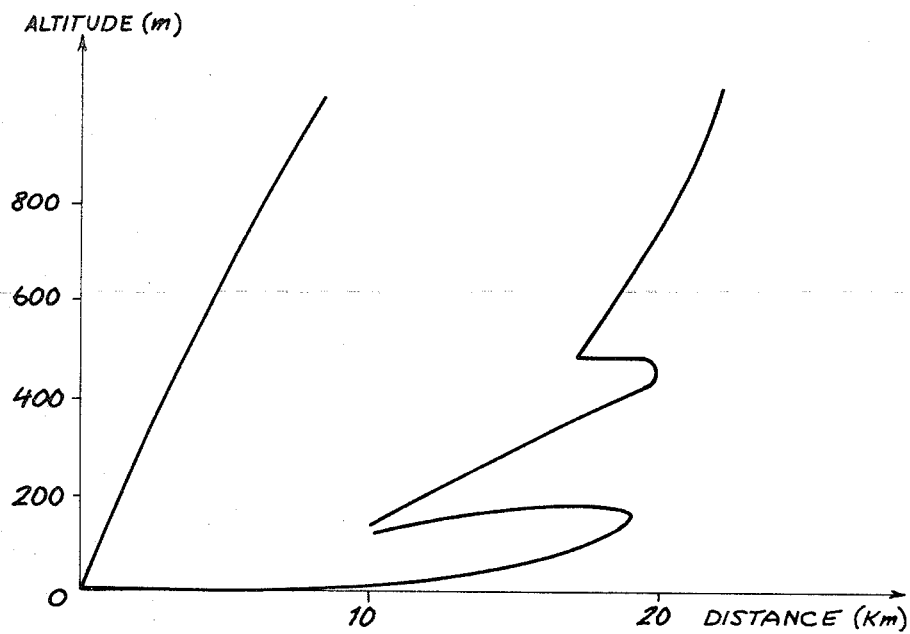
FIG. 9 is a diagram similar to FIG. 8, obtained with a larger antenna.

FIG. 9, finally, shows the radiation pattern for an antenna double the size of that giving rise to the diagram of the two preceding Figures. Except for very low altitudes, this pattern has almost no gaps for distances of up to about 20 km.

I claim:

1. A system for detecting low-flying objects, comprising:
   a radar station provided with antenna means for transmitting and receiving microwave energy between said station and a remote target directly over a first path and via surface reflection over a second path;
   a source of microwave energy to be transmitted;
   indicator means for received microwave energy;
   receiving means for incoming energy reflected from remote objects;
   circuit means for alternately connecting said antenna means to said source and to said indicator means, said circuit means forming two conjugate channels establishing different phase relationships between energy components received over said paths;
   switchover means for alternately connecting said receiving means to said channels;
   actuating means for periodically reversing said switchover means;
   monitoring means in said receiving means for detecting the relative magnitude of the energy components received over said paths; and
   control means for modifying the operation of said actuating means in response to an output of said monitoring means to select the more strongly energized channel.

2. A system as defined in claim 1 wherein said monitoring means includes storage means for energy quantities received in different positions of said switchover means and comparison means connected to said storage means.

3. A system as defined in claim 1, further comprising transmit/receive switch means cascaded with said switchover means for alternately connecting said channels to said source and to said receiving means.

4. A system as defined in claim 1 wherein said antenna means comprises a pair of horn radiators respectively connected to said channels.

* * * * *